(12) United States Patent
Bergman et al.

(10) Patent No.: US 11,766,652 B2
(45) Date of Patent: Sep. 26, 2023

(54) GAS-SOLID CONTACTING DEVICE

(71) Applicant: Yilkins B.V., Groningen (NL)

(72) Inventors: Peter Christiaan Albert Bergman, Callantsoog (NL); Evert-Jan Oltvoort, Deventer (NL); Robert Johan Boers, Borculo (NL)

(73) Assignee: Yilkins B.V., Groningen (NL)

( * ) Notice: Subject to any disclaimer, the term of this patent is extended or adjusted under 35 U.S.C. 154(b) by 186 days.

(21) Appl. No.: 17/437,445

(22) PCT Filed: Mar. 17, 2020

(86) PCT No.: PCT/NL2020/050178
§ 371 (c)(1),
(2) Date: Sep. 9, 2021

(87) PCT Pub. No.: WO2020/190135
PCT Pub. Date: Sep. 24, 2020

(65) Prior Publication Data
US 2022/0168700 A1    Jun. 2, 2022

(30) Foreign Application Priority Data
Mar. 20, 2019    (NL) ...................................... 2022774

(51) Int. Cl.
*B01J 8/38*        (2006.01)
*B01J 8/18*        (2006.01)
(Continued)

(52) U.S. Cl.
CPC .............. *B01J 8/44* (2013.01); *B01J 8/0015* (2013.01); *B01J 8/1827* (2013.01); *B01J 8/386* (2013.01);
(Continued)

(58) Field of Classification Search
CPC . B01J 8/44; B01J 8/0015; B01J 8/1827; B01J 8/386; B01J 2208/00761;
(Continued)

(56) References Cited

U.S. PATENT DOCUMENTS 6,564,472 B1    5/2003   Dodson
9,845,992 B2   12/2017   Kokourine et al.
(Continued)

FOREIGN PATENT DOCUMENTS

WO         97/23284 A1    7/1997
WO    2006/027009 A1    3/2006
(Continued)

OTHER PUBLICATIONS

Machine translation for WO-2012/171567 A1 (Year: 2023).*

*Primary Examiner* — Huy Tram Nguyen
(74) *Attorney, Agent, or Firm* — Hoffmann & Baron, LLP

(57) ABSTRACT

A device for processing a flow of particulate material by contact with a gas flow includes a housing defining a processing chamber. This chamber includes a gas distribution plate having openings. The gas distribution plate separates a lower gas plenum from a solid-gas contact zone. The contact zone has at least one cylindrical partition upstanding from the gas distribution plate dividing an inner section from an adjacent annular outer section. The at least one partition is provided with a transfer opening for the particulate material. The housing is also provided with an inlet for supplying particulate material to the inner section and an outlet for discharging processed particulate material from the annular outer section.

16 Claims, 5 Drawing Sheets

(51) Int. Cl.
 *B01J 8/44* (2006.01)
 *B01J 8/00* (2006.01)

(52) U.S. Cl.
 CPC ............... *B01J 2208/00761* (2013.01); *B01J 2208/00938* (2013.01)

(58) Field of Classification Search
 CPC ...... B01J 2208/00938; B01J 2208/0084; B01J 2208/00929; B01J 4/004; B01J 4/005; B01J 2219/1945; B01J 19/006
 USPC .......................................................... 422/139
 See application file for complete search history.

(56) References Cited

U.S. PATENT DOCUMENTS

2003/0202912 A1  10/2003  Myohanen et al.
2013/0220790 A1   8/2013  Dodson

FOREIGN PATENT DOCUMENTS

| WO | 2006/067546 A1 | 6/2006 | |
| WO | WO-2012171567 A1 * | 12/2012 | ................ B01J 2/16 |

* cited by examiner

GAS-SOLID CONTACTING DEVICE

CROSS-REFERENCE TO RELATED APPLICATIONS

This application is the National Stage of International Application No. PCT/NL2020/050178, filed Mar. 17, 2020, which claims the benefit of Netherlands Application No. 2022774, filed Mar. 20, 2019, the contents of which is incorporated by reference herein.

FIELD OF THE INVENTION

The present invention relates to a device for processing a flow of particulate material by contact with a gas flow.

BACKGROUND OF THE INVENTION

WO2006/027009A1 has disclosed a device for treating a particulate product. This known device comprises a process chamber for receiving and treating the product. The bottom thereof consists of a plurality of superimposed overlapping guiding plates between which annular slits are formed for passage of process air with an essentially horizontal outward displacement component. The bottom is provided with an annular gap nozzle in the center thereof. The nozzle mouth is shaped in such a way that a plane spray cake substantially parallel to the bottom level can be sprayed.

Toroidal bed reactors or swirling fluidized bed reactors are well-known devices for solid-gas contact processing, such as chemical reactions, physical processes and heat-exchange operations like drying and cooling of solids and/or the gas used. In general, such a gas-solid contacting device has a processing zone, wherein the solid particles circulate in a gas induced, circumferential and toroidal flow pattern. The gas flow is charged to the processing zone through a system of blades (also known as vanes) having gas openings that have an angled configuration creating jets of gas into the processing zone causing a circulating toroidal movement of the particulate material.

U.S. Pat. No. 6,564,472B1 discloses such a device, as well as the principles of designing and appropriate operation thereof. A toroidal bed reactor known from Torftech (Mortimer Technology) today (http://www.torftech.com/torbed_technology.html; see also US2013220790A1) is still based on this disclosure.

US2013220790A1 discloses a toroidal bed reactor for processing a particulate material having means for allowing it to operate continuously regardless of the material being processed. This known reactor comprises a processing chamber, typically a conventional toroidal bed reactor (defined as a reactor in which a material to be treated is embedded and centrifugally retained within a compact, turbulent, toroidally circulating bed of particles and processing fluid, circulating about an axis of the processing chamber) having at least one inlet for the particulate material and one or more outlets for processed particulate material. The processing chamber comprises an annular treatment zone and a plurality of processing fluid inlets arranged in a base of the annular treatment zone and configured so that in use jets of processing fluid pass into the annular treatment zone through the plurality of processing fluid inlets to establish a spiral flow of particulate material in the annular processing zone. The one or more outlets of the processed particulate material are located in the base and surrounded by the plurality of processing fluid inlets such that the spiral flow of particulate material circulates around the one or more outlets. Means for deflecting a portion of the spiral flow of particulate material in the annular processing zone radially inwards from the spiral flow are arranged in the processing chamber, so that the particulate material leaves the processing chamber through the one or more outlets for processed particulate material.

A practical embodiment according to this configuration applies a processing chamber with a maximum contact surface defined by $0.25*\pi*(D2out-0.64*D2out)$, wherein D2out is the diameter of the processing chamber, meaning that (only) the outer 20% of the diameter of the reactor is effectively used. According to the applicant/manufacturer such a width of the reactor bed is optimal for the toroidal flow pattern and a precondition to deliver the heat and mass transfer characteristics. Similar limitations are set to the bed height in the reactor.

The mass and heat transfer characteristics of this known toroidal bed are the main features of the device. However, a reactor having this configuration has practical limitations, which generally also apply to other toroidal (swirling) bed reactors.

Deflection of a portion of the spiral flow of particulate material in the annular processing zone in a (radially) inward direction causes undesired accumulations due to the centrifugal forces and may result in instability of the toroidal bed.

In operation, a toroidal bed reactor having this configuration utilizes only a small portion of the cross section, the outer annular zone, as a processing area. Therefore, despite the potential of the heat and mass transfer characteristics, the toroidal bed reactor is voluminous.

Upon continuous operation this reactor has a small residence time, so that more reactors in series are required when longer processing times are required. It is expected that the commercially available continuous devices have a residence time of 30 to 60 seconds.

In a toroidal bed reactor with CSTR (Continuous Stirred Tank Reactor) behaviour, meaning that the solids and gas are ideally mixed (or at least have serious forward- and backward mixing patterns), the reactor has not a distinct feeding point of the particulate material and of the gas flow as the flow pattern in the processing zone is a closed toroid having an infinite (or at least indefinite) length. This appears to result in a mass and energy dissipation/exchange that is on average the same everywhere in the processing zone. The advantage thereof is a very constant heat/mass distribution and the temperature in the bed can be controlled very well. However, CSTR behaviour is accompanied by a wide residence time distribution, caused by a portion of the particulate material taking a short-cut from the entry to the exit of the processing zone with a short residence time, and by a portion that continues to circulate in the processing zone longer than the average. This means that some particles can exit the reactor practically untreated, as well other particles that are discharged in an overreacted state. The result is a wide distribution of the treatment characteristics of the particulate material, although the average value is fine.

The present invention aims at reducing one or more of the above disadvantages at least to some extent.

SUMMARY OF THE INVENTION

It is an object of the invention to improve the utilization of the available reactor volume in a gas-solid contacting device.

Another object of the invention is to improve the uniformity of the residence time, and thus contact time between the particulate material and the gas, thereby improving the processing of individual particles.

Yet another object of the invention is to allow to extend the residence time beyond the above typical values compared to prior art configurations having a similar diameter), thereby at least partially avoiding the necessity of multiple reactors in series if longer processing times are required.

According to the invention a device for processing a flow of particulate material by contact with a gas flow comprises a housing defining a processing chamber,
the processing chamber comprising
a plenum, arranged at the lower part of the processing chamber, having a gas inlet for introducing a gas flow in the plenum,
a contact zone, arranged above the plenum, for contacting the flow of particulate material with the gas flow,
wherein the plenum and contact zone are separated by a gas distribution plate,
wherein the contact zone comprises a contact path for contact between the flow of particulate material and the gas flow, the contact zone having at least one cylindrical partition upstanding from the gas distribution plate dividing an inner section of the contact path from an adjacent annular outer section, wherein the at least one partition is provided with a transfer opening configured to allow passage of the particulate material from the inner section to the adjacent annular outer section,
wherein the gas distribution plate is provided with openings configured to allow passage of the gas flow from the plenum to the contact zone in an obliquely upwardly directed direction to establish a displacement of particulate material in a displacement direction along the contact path in the contact zone,
an inlet for supplying particulate material to the inner section of the contact path at a supply position upstream of the transfer opening in the adjacent partition as seen in the particulate material displacement direction in the inner section of the contact path,
an outlet for discharging processed particulate material from the annular outer section of the contact path at a discharge position downstream of the transfer opening in the adjacent partition as seen in the particulate material displacement direction in the annular outer section of the contact path.

The device according to the invention comprises a processing chamber, generally having a circular cross-section delimited by the upright walls of the housing. In the lower part of the processing chamber a plenum (hereinafter also indicated as lower plenum; in the art also known as wind box) having a gas inlet for feeding gas is arranged, which lower plenum is separated from an above contact zone by a gas distribution plate (in the art also known as blade or vane), wherein a plurality of openings (hereinafter also referred to as swirl openings) is provided. The swirl openings induce a obliquely rotational component to the gas jets from the plenum into the contact zone causing displacement of the particulate material in a displacement direction from the supply position along the contact path to the discharge position. Upstanding from the gas distribution plate in the contact zone, at least one cylindrical partition is arranged. Typically a number of partitions is present, such as in the range of 2-10, e.g. 3-5, having different diameters, e.g. (0.2 see below), 0.4, 0.6 and 0.8 times the inner diameter of the processing chamber. The partition(s) delimit the contact path from the supply position of the particulate material to the discharge position thereof, wherein the gas flow contacts and entrains the particulate material as a moving (sliding) layer or bed over the gas distribution plate. A partition divides the contact path into an inner contact path section, typically an inner annular contact path section and an adjacent outer annular contact path section. In case of multiple partitions the inner (annular) contact path section will be referred to as innermost (annular) contact path section and the outer annular contact path section as the outermost annular contact path section, while any annular contact path section that is arranged between the innermost (annular) contact path section and outermost annular contact path section is indicated as an intermediate annular contact path section. The particulate material is fed to the inner (annular) contact path section through an inlet at the supply position and processed particulate material is discharged—together with the gas flow or a proportion thereof—from the outer annular section through an outlet at a discharge position. Each partition has a transfer opening (also referred to as port) allowing transfer of particulate material being processed from an inner section to an adjacent outer section of the contact path by the centrifugal force caused by the gas flow. Thus the particulate material being processed moves from the inner section to the discharge outlet at the outer section following a spiral path, which movement is forced by the gas flow through the swirl openings in the gas distribution plate. The supply position of the particulate material in the inner (annular) section is upstream of the transfer opening in the adjacent partition, advantageously such that the supplied particulate material is displaced along the (annular) inner contact path section substantially over the full (circular) length thereof to the transfer opening. Then a short-cut from the supply position to the transfer opening is prevented. Advantageously the supply position in the inner (annular) section of the contact path and the transfer opening in the adjacent partition are at least 270° apart as seen in the particulate material displacement direction in the inner section of the contact path. Preferably the supply position is also adjacent to the transfer opening in the adjacent partition as seen in a direction opposite to the particulate material displacement direction in the inner section of the contact path. Overlap is possible, provided the rotational component of the velocity is large enough to prevent a short-cut of the particulate material from the supply position to the transfer opening or from a transfer opening to the discharge position. The supplied particulate material is displaced along an annular contact path section substantially over the full circular length thereof from the supply position to the transfer opening. The same reasoning applies to the position of the discharge outlet with respect to the transfer opening. Advantageously the discharge position in the annular outer section of the contact path and the transfer opening in the adjacent inwardly arranged partition are at least 270° apart as seen in the particulate material displacement direction in the annular outer section of the contact path, preferably the discharge position is adjacent to the transfer opening in the adjacent partition as seen in a direction opposite to the particulate material displacement direction in the annular outer section of the contact path.

Typically the particulate material is fed to the inner contact path section co-currently, preferably tangentially, to the rotationally induced gas flow. More than one supply position in the inner contact path section is feasible.

Optionally the processing chamber also has an upper discharge section connected to an outlet for removing the gas flow (or remainder thereof) from the processing chamber, as well as any dust and lightweight particles of the particulate material being entrained. The dust and lightweight particles may be filtered from the gas flow and returned to the particulate flow or otherwise collected, e.g.

using cyclones arranged in the upper discharge section making use of the rotational movement already induced to the gas flow. The gas can be recirculated to the plenum, optionally after conditioning certain characteristics thereof such as temperature, pressure, composition and/or moisture content.

The device according to the invention has a contact zone covering a large cross-sectional area of the processing chamber compared to prior art devices that make use of only the outer (about 20%) peripheral portion thereof. Thus operation of the device utilizes a larger cross-sectional area of the processing chamber for contact between gas and solids. Additionally as the stream of the particulate material has plug flow characteristics, the residence time can be controlled in an accurate manner, ensuring that individual particles are subjected to substantially the same processing treatment. Furthermore by providing a well-defined spiralling contact path delimited by the partition(s) the residence time can be prolonged compared to the prior art toroidal bed reactor configurations, while the favourable mass and energy transfer characteristics through intimate contact are maintained.

In a preferred embodiment the contact zone comprises a plurality of upstanding cylindrical partitions, each partition having a transfer opening configured to allow passage of the particulate material from an inner section to an adjacent outer section of the contact path, wherein the transfer opening of an inward partition is upstream of the transfer opening in the adjacent outward partition as seen in the particulate material displacement direction in the annular section of the contact path between the adjacent partitions, preferably the transfer opening of the inward partition and the transfer opening in the adjacent outward partition are at least 270° apart as seen in the particulate material displacement direction in the annular section of the contact path between the adjacent partitions, more preferably the transfer opening in the outward partition is adjacent to the transfer opening in the adjacent inward partition as seen in a direction opposite to the particulate material displacement direction in the annular section of the contact path between the adjacent partitions. In these arrangements the particulate material is preferably forced to flow the full circular length of each annular flow section path from its entry to its exit, thereby preventing short-cutting via a straight line of sight from one transfer opening in a partition directly to the transfer opening in an adjacent outward partition thereby by-passing the intermediate annular contact path section between the adjacent partitions.

In a further advantageous embodiment the gas inlet comprises a central duct extending vertically through the contact zone into the gas plenum, the duct delimiting the inner side of the inner annular contact path section. In this embodiment the central duct e.g. having a diameter of 0.2 times the diameter of the processing chamber, acts as the inward boundary of the inner annular contact path section thereby contributing to the initial rotational movement of the particulate material and gas flow. Furthermore feeding the gas flow to the plenum in a vertical direction opposite to the upward gas flow through the swirl openings enhances the gas distribution in the plenum. Typically the central duct extends from the top of the processing chamber down to the lower plenum. Preferably the gas flow is at least partially removed from the processing chamber via a gas outlet that encloses the central duct concentrically at the top of the processing chamber.

Advantageously the swirl openings having an angled configuration are adapted to the annular contact path section that they feed. In a preferred embodiment the gas distribution plate comprises outwardly directed, slit shaped openings that are arranged in annular sections, wherein in each annular section the openings are arranged at a radial angle with respect to the radius of the gas distribution plate. The slit shape of the swirl openings covers substantially the full width of an annular contact path section ensuring displacement of the particulate material by the gas flow preventing dead zones. The radial angle, typically in the range of 15-30°, takes into account that due to the centrifugal force the particulate material tends to accumulate at the partition or housing wall and forces the particulate material forward. In an annular section the radial angle is generally constant. From section to section the radial angle may be different, in particular the radial angle of the slit shaped swirl openings decreases stepwise from the innermost annular section to the outermost section.

In a preferred embodiment the gas distribution plate comprises outwardly directed, slit shaped openings that are arranged in annular sections, wherein the openings have an axial angle with respect to the axis of the contact zone in the direction of the flow of particulate material in order to provide the gas flow with an obliquely upward direction to establish a displacement of particulate material along the contact path in the contact zone. Typically the axial angle is in the range of 45-60°.

In a preferred embodiment the gas distribution plate comprises slit shaped openings that are arranged in annular sections, wherein the width of a slit shaped opening increases from its inner end to its outer end. In this embodiment the flow-through area of a swirl opening increases outwardly to compensate for the larger flow of particulate material at the outer portion of an annular section.

Most preferably the swirl openings are arranged at a radial angle, an axial angle and have a trapezium shape with the small base at its inner end and the large base at its outer end, as explained above.

To further enhance and/or control the gas distribution in the plenum to the gas distribution plate preferably the plenum comprises a manifold, arranged below the gas distribution plate, having manifold openings that are adjustable in size. Adjustable manifold openings allow to adapt the gas flow to the proportion needed at a particular contact path section. E.g. upon drying particulate material with (heated) air, the wet particulate material is fed to the innermost annular contact path section where more heat is required to dry the particulate material than at intermediate (section(s) if any and the outermost annular contact path section, where the particulate material enters in a partially dried state.

In an example the manifold is of a diaphragm type that allows to control the opening size per section. E.g. the manifold comprises lower annular plate sections having lower manifold openings and upper annular plate sections having upper manifold openings, wherein co-operating lower and upper annular plate sections are displaceable concentrically with respect to each other.

In yet another embodiment each annular contact path section or a few thereof from the total number of sections is fed by a dedicated gas flow with respect to temperature, moisture, pressure and/or composition, e.g. using a gas manifold of annular flow channels each having its own gas inlet, which can be served with the dedicated gas from an appropriate source. Such an embodiment allows to consecutively perform different processing operations on the particulate material in the annular contact path sections from the inside to the outside of the contact zone.

The manifold openings may have a radially slotted configuration. In an advantageous embodiment the manifold openings have an arc sectioned slotted configuration.

In order to force the particulate material through the discharge outlet at the outer annular contact path section the annular outer contact path section can have a deflector for directing processed particulate material to the discharge outlet, advantageously separating the opening in the inwardly adjacent partition from the discharge position of the outlet.

The transfer opening in a partition through which the particulate material is transferred from an annular contact path section to the adjacent annular contact path section that is arranged outwardly therefrom, advantageously has an adjustable size. In an embodiment its height above the gas distribution plate is adjustable, e.g. using a slide. In order to allow a certain hold-up of particulate material in an annular contact path section, the transfer opening(s) may be positioned at a certain height above the plane of the gas distribution plate. Then the displacement pattern of particulate material, hold-up thereof and gas flow rate are linked together. To avoid stalling of the moving bed layer of particulate material, it is advantageous to enable adjustment of the opening height, in particular the lower edge of the transfer opening, preferably automatically. The lowest height of the lower edge is at the level of the gas distribution plate. Then no hold-up occurs.

In yet another preferred embodiment a downstream portion of the wall delimiting the transfer opening in the partition is upwardly obliquely arranged. When particles having a long dimension, such as wire like particles, e.g. fibres, hit a vertical edge of the partition wall delimiting the transfer opening, they tend to fold around and stick to this edge. In time the number of sticked particles might grow and accumulate into a cluster, which cluster can be an obstacle for the transfer of other particles through the partition opening. Hence the exiting annular contact path section can start to stall. This problem is circumvented by providing an upwardly oblique portion, e.g. 45°. Instead of sticking at the hitting point, collapsing particles will slide to a higher position above the moving bed layer of particulate material so that the collapsed particles do not block the transfer opening. After certain growth the cluster can become too large, fall down and disintegrate. In a further embodiment adjacent the upwardly oblique portion a downwardly sloping portion is present. In this embodiment any particulates sliding over the upwardly oblique portion will loosen ("jump") at the top thereof due to the sudden absence of support.

In order to prevent overflow of particulate material from one annular contact path to an adjacent outer over the top edge of a partition advantageously the top of a partition is provided with a retainer, e.g. an inwardly directed strip partially covering the adjacent inner contact path section.

The device according to the invention can be used for many treatments of particulate material or the gas involved, such as thermally processing biomass material comprising cooling, drying, torrefaction, pyrolysis, combustion and/or gasification thereof, chemical processing including catalytically processing, and cooling or drying of feed or food. Other applications include separation of a particulate material into fractions based on shape, mass, size and/or density, like screening, wherein the device according to the invention is used as a wind shifter. Generally the particulate material is bulk good, such as biologic materials like biomass, food and feed. Plastic materials can also be processed in the device according to the invention. In case of moist materials that possess a high tendency to (temporarily) adhere to the partitions, a partition could be provided with a non-stick coating, in particular the partition wall part at the inner contact path section. In case of processing abrasive particulate material a wear-resistant coating could be applied. Such coatings may be provided as a separate insert e.g. a sheet or the like, that can be exchanged and/or replaced easily. One or more of the partitions may be heated and/or cooled themselves, e.g. double-walled partitions. Heating of the partitions, in particular the innermost partitions, reduces the risk of undesired condensate deposit and sticking at the respective partitions.

BRIEF DESCRIPTION OF THE DRAWINGS

The invention is further illustrated by the attached drawings, wherein.

DETAILED DESCRIPTION OF THE INVENTION

Figure 1:
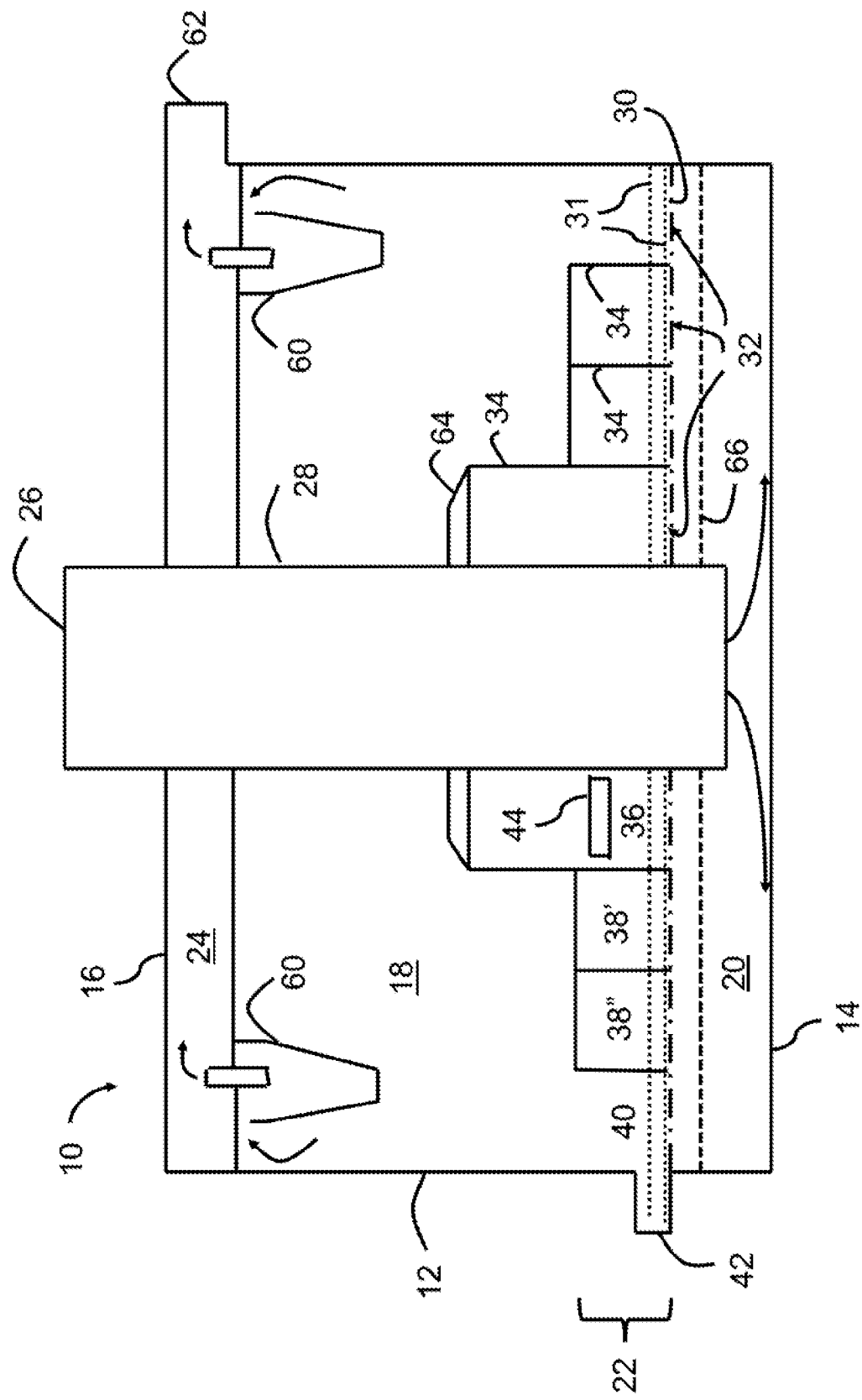
FIG. 1 shows a diagram of an embodiment of a gas-solid contact device according to the invention.
Figure 2:
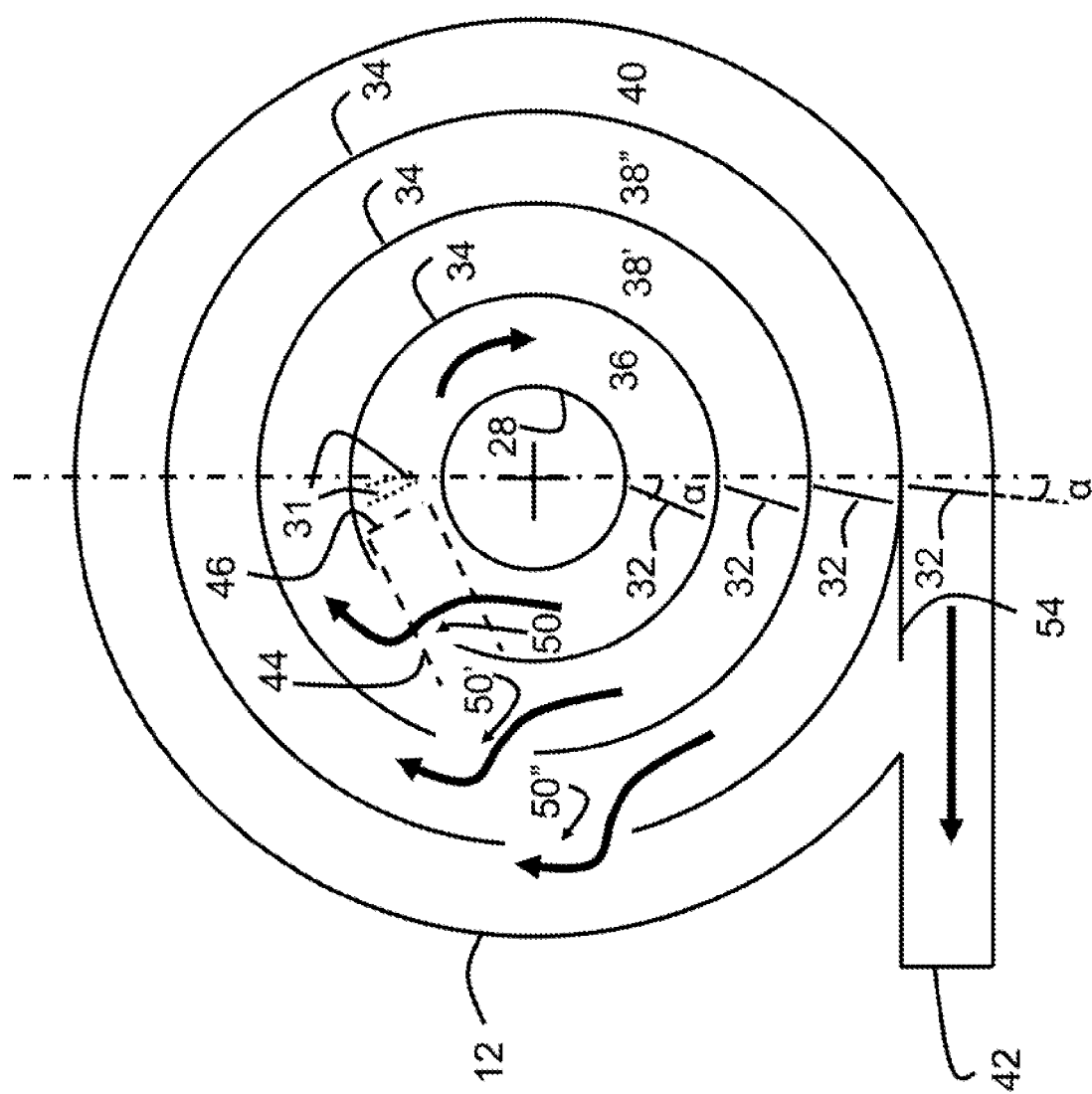
FIG. 2 shows a cross-section of the contact zone of the embodiment of FIG. 1.

In FIG. 1 an embodiment of a gas-solid contact device is shown diagrammatically and is indicated in its entirety by reference numeral 10. FIG. 2 shows a cross-section at a level just above the gas distribution plate thereof.

The gas-solid contact device 10 comprises a cylindrical housing 12 having a bottom wall 14 and top wall 16 delimiting a processing chamber 18. The processing chamber 18 delimits a lower plenum 20, a contact zone 22 and a gas header section 24. The housing 12 is provided with a gas inlet 26, connected to a vertical central duct 28 that extends through a gas distribution plate 30 into the lower plenum 20. The gas distribution plate 28 is provided with a plurality of swirl openings 32, that are configured to inject directed gas jets from the gas plenum 20 into the contact zone 22. The swirl openings 32 have a size that prevents particulate material 31 (shown as two dotted lines in FIG. 1) to enter the plenum 20 from the contact zone 22. Cylindrical partitions 34 are arranged on top of the gas distribution plate 30 in the contact zone 22, thereby forming a contact path comprising an inner (innermost) annular contact path section 36, with adjacent intermediate annular contact path sections 38' and 38" respectively, and an outer (outermost) contact path section 40 having a tangential outlet 42 at a discharge position for discharging processed particulate material. The particulate material is fed by a feed injector 44 (see also FIG. 2), of which the outlet 46 at the supply position is positioned at the innermost section 36 between the central duct 28 and the innermost partition 34 and delivers the particulate material as a layer in a direction co-current to the gas flow through the swirl openings 32. The particulate material is forced by the gas flow in a spiralling contact path (see FIG. 2 and indicated by bold arrows) from the outlet 46 along the innermost section 36, through transfer opening 50 in the innermost partition 34, along the intermediate section 38', through transfer opening 50' in the intermediate partition 34', along the intermediate section 38", through transfer opening 50" in the outermost partition 34" and along outermost section 40 through the outlet 42. As shown, the transfer opening 50 in the innermost partition 34 is almost adjacent to the outlet 46 of the feed injector 44 in the innermost annular contact path section 34, such that the portion of particulate material transferred through the transfer opening 50 creates a void in the flow of particulate material in the innermost annular contact path section 34, which is subsequently filled by fresh particulate material supplied by the feed injector 44. This kind of transfer and subsequent refill is repeated in the intermediate sections and in the outermost section with respect to the discharge outlet 42. The transfer opening 50' in the intermediate partition 34' is situated adjacent but downstream of the transfer opening 50 in the innermost partition 34. The staggered configuration of the supply position, transfer openings and discharge position with respect to one another forces the particulate material to complete almost a full annular contact path section (arc section >270°) before being transferred to the adjacent section positioned outwardly. Optionally a deflecting wall 54 is positioned in the outermost annular contact path section 40 that directs the processed particulate material or a portion thereof through the outlet 42 at the outlet position. In this embodiment in the top of the processing chamber 18 the gas header section 22 houses one or more separators 60 such as cyclones, wherein dust and lighter particles are separated from the gas flow. The gas flow leaves the housing 12 trough gas outlet 62. FIG. 1 shows also that the inner partition 34 is provided with a retainer 64 for preventing flow of particulate material from the innermost annular contact path section 36 to the adjacent intermediate annular contact path section 38'. In the embodiment shown the plenum 20 is provided with a gas manifold 66.

FIG. 2 schematically shows that the swirl openings 32 have a slit shape. The slit length approaches the width of the respective annular contact path section. The slits are arranged at a radial angle α, wherein the radial angle α of the slits decreases stepwise from the innermost section 36 to the outermost section 40.

Figure 4:
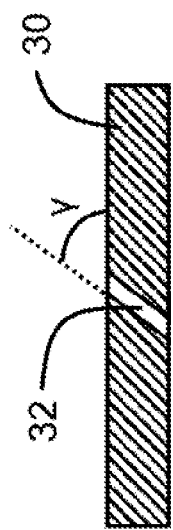
FIG. 4 shows the cross section A-A of FIG. 3.
Figure 5:
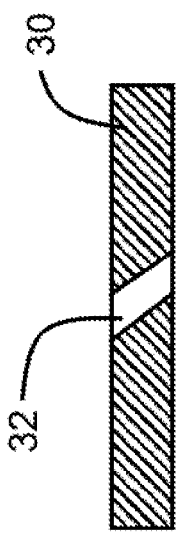
FIG. 5 shows the cross-section B-B of FIG. 3.
Figure 3:
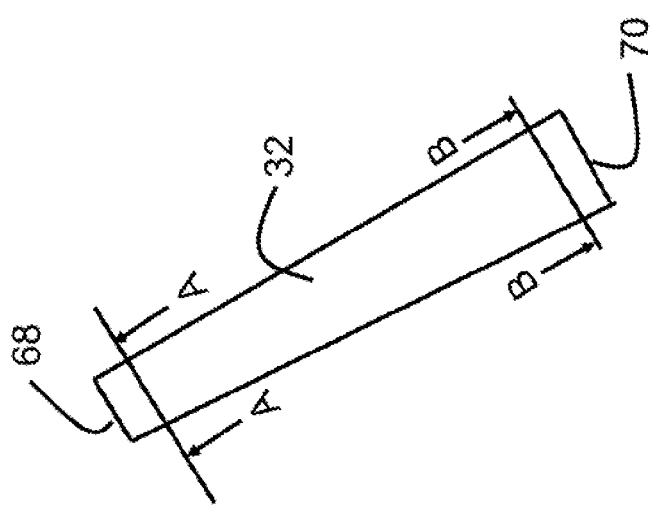
FIG. 3 shows a top view of a swirl opening in a gas distribution plate.

FIG. 3 shows an embodiment of a slit shaped swirl opening 32 in more detail. As is apparent from the cross-sections A-A and B-B in FIGS. 4 and 5 the slit shaped swirl opening also has an axial angle γ, while the width of the slit increases gradually from the inner end 68 towards the outer end 70.

Figure 7:
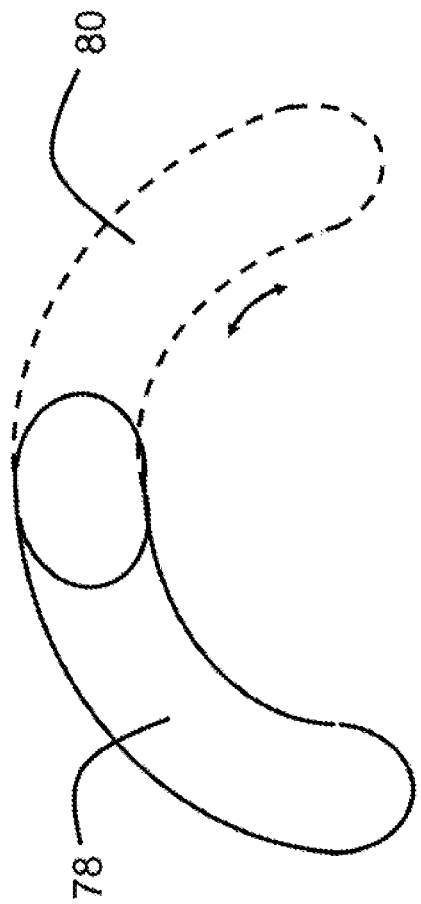
FIG. 7 shows a detail of a manifold opening.
Figure 6:
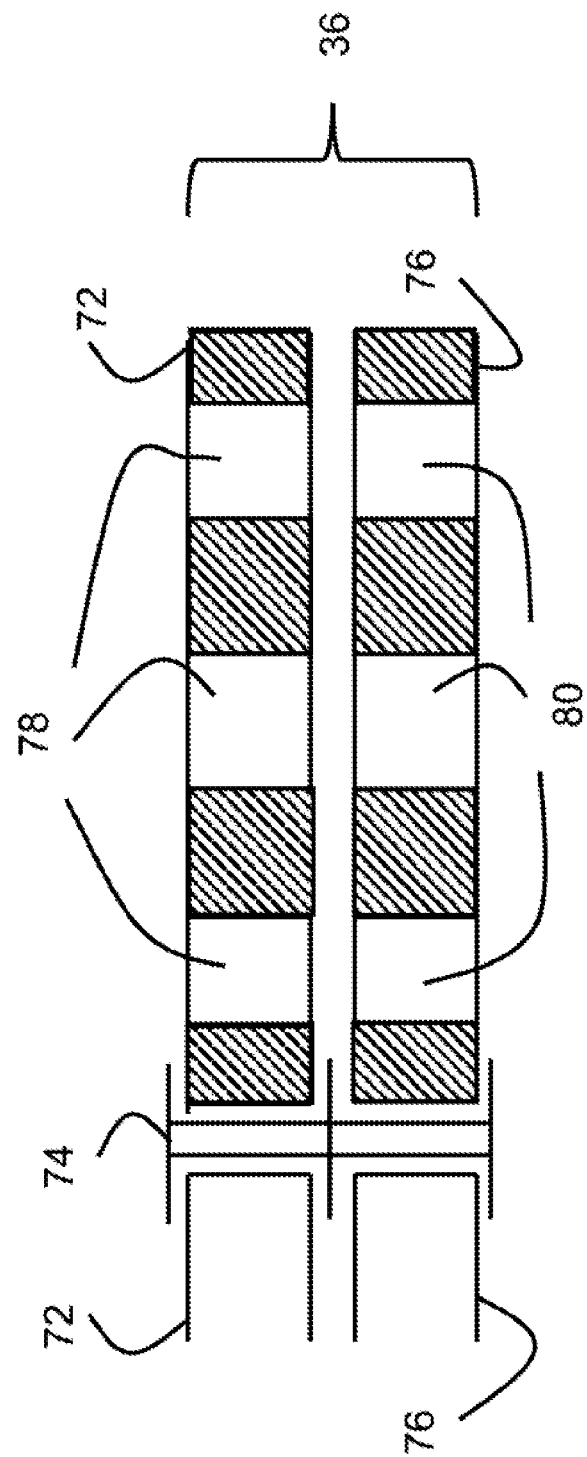
FIG. 6 shows an embodiment of a manifold.

FIG. 6 shows in part an embodiment of a diaphragm type manifold 66. The manifold 66 comprise an upper manifold plate comprising a number of annular upper manifold sections 72 held in position within profiled beams 74, in the lower part of which similar annular lower manifold sections 76 are arranged in a sliding manner. The upper and lower manifold sections 72 and 76 are provided with upper manifold openings 78 and lower manifold openings 80 respectively, typically arc sector like openings. By rotating of the lower manifold section 76 (indicated by an arrow) the flow through area for gas can be adjusted, as is shown in FIG. 7, wherein the lower manifold opening 80 is not fully aligned with the upper manifold opening 78.

Figure 8:
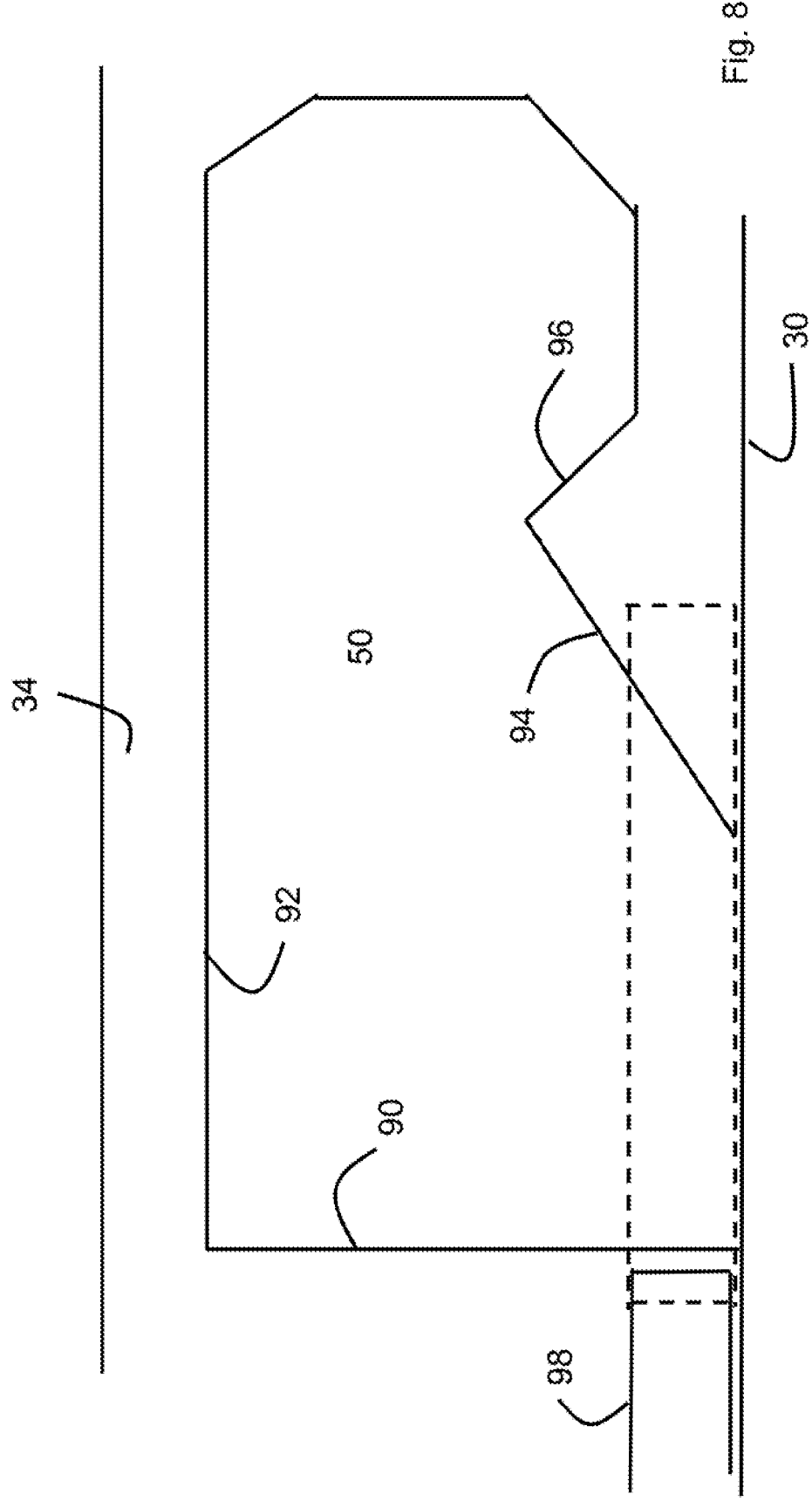
FIG. 8 shows an embodiment of a transfer opening in a partition.

FIG. 8 shows an embodiment of a transfer opening 50 in a partition 34 in more detail. The transfer opening 50 is delimited by an upstanding upstream edge 90, an upper edge 92, part of the top surface of the gas distribution plate 30 adjacent the upstanding upstream edge, an upwardly oblique downstream edge portion 94 of the partition 34, and an adjacent, downwardly sloping portion 96. The angled portion 94 serves as a sliding surface for particles, in particular long particles like fibres and prevent blocking of the transfer opening 50. At the bottom a movably, e.g. sliding, lower edge part 98 is arranged, whereby the transfer cross-section of the opening 50 can be adjusted. An actuator for positioning the lower edge part 98 is not shown. The same configuration can be applied to the discharge outlet for processed particulate material.

The invention claimed is:

1. A device for processing a flow of particulate material by contact with a gas flow, comprising
 a housing defining a processing chamber and having a gas inlet for introducing a gas flow in a plenum of the processing chamber,
 wherein the processing chamber comprises
 the plenum, arranged at the lower part of the processing chamber,
 a contact zone, arranged above the plenum, for contacting the flow of particulate material with the gas flow,
 wherein the plenum and contact zone are separated by a gas distribution plate,
 wherein the contact zone comprises a contact path for contact between the flow of particulate material and the gas flow, the contact zone having multiple cylindrical partitions upstanding from the gas distribution plate dividing an inner section of the contact path from an adjacent annular outer section, wherein each partition is provided with a transfer opening configured to allow passage of the particulate material from the inner section to the adjacent annular outer section of the contact path separated by the respective partition, wherein the inner section of the contact path is an annular inner section, and wherein the transfer opening of an inward partition and the transfer opening in an adjacent outward partition are at least 270° apart as seen in the particulate material displacement direction in the annular section of the contact path between the adjacent partitions,
 wherein the gas distribution plate is provided with openings configured to allow passage of the gas flow from the plenum to the contact zone in an obliquely upward direction to establish a displacement of particulate material in a displacement direction along the contact path in the contact zone,
 the housing further comprising an inlet for supplying particulate material to the inner section) of the contact path at a supply position upstream of the transfer opening in an adjacent partition as seen in the particulate material displacement direction in the inner section of the contact path; wherein the supply position in the inner section of the contact path and the transfer opening in the adjacent partition are at least 270° apart as seen in the particulate material displacement direction in the inner section of the contact path, and an outlet for discharging processed particulate material from the annular outer section of the contact path at a discharge position downstream of the transfer opening in an adjacent partition as seen in the particulate material displacement direction in the annular outer section of the contact path, wherein the discharge position in the annular outer section of the contact path and the transfer opening in the adjacent partition are at least 270° apart as seen in the particulate material displacement direction in the annular outer section of the contact path.

2. The device according to claim 1, wherein the gas inlet comprises a central duct extending through the contact zone into the gas plenum, the duct delimiting the inner side of the annular inner section of the contact path.

3. The device according to claim 1, wherein the transfer opening in an outward partition is adjacent to the transfer opening in the adjacent inward partition as seen in a direction opposite to the particulate material displacement direction in the annular section of the contact path between the adjacent partitions.

4. The device according to claim 1, wherein the gas distribution plate comprises outwardly directed, slit shaped openings that are arranged in annular sections.

5. The device according to, claim 4, wherein in each annular section the openings are arranged at a radial angle with respect to the radius of the gas distribution plate, preferably the radial angle of the openings decreases stepwise from the inner annular section to the outer annular section.

6. The device according to claim 1, wherein the gas distribution plate comprises outwardly directed, slit shaped openings that are arranged in annular sections, wherein the openings have an axial angle with respect to the axis of the contact zone in the direction of the flow of particulate material.

7. The device according to claim 1, wherein the gas distribution plate comprises slit shaped openings that are arranged in annular sections, wherein the width of a slit shaped opening) increases from its inner end to its outer end.

8. The device according to claim 1, wherein the plenum comprises a manifold, arranged below the gas distribution plate, having manifold openings that are adjustable in size.

9. The device according to claim 8, wherein the manifold comprises lower annular plate sections having lower manifold openings and upper annular plate sections having upper manifold openings, wherein co-operating lower and upper annular plate sections are displaceable concentrically with respect to each other.

10. The device according to claim 8, wherein the manifold openings have an arc sectioned slot configuration.

11. The device according to claim 1, wherein the outer annular section of the contact path has a deflector for directing processed particulate material to the discharge outlet.

12. The device according to claim 1, wherein a transfer opening has an adjustable size.

13. The device according to claim 12, wherein the lower edge of a transfer opening in a partition has an adjustable height above the gas distribution plate.

14. The device according to claim 1, wherein the downstream upstanding edge of the transfer opening has a part that is obliquely in the direction of the flow of particulate material adjacent the opening.

15. The device according to claim 1, wherein the top of a partition is provided with a retainer for preventing particulate material passing over the top edge from an inner section to an adjacent outer section.

16. A method of processing particulate material by contacting the particulate material with a gas or of processing the gas involved in a device according to claim 1, wherein said processing is selected from the group comprising thermally processing particulate biomass material comprising cooling, drying, torrefaction, pyrolysis, combustion and/or gasification thereof; chemical processing including catalytically processing, and cooling or drying of feed or food, separating particulate material into fractions based on shape, mass, size and/or density, comprising the steps of supplying the particulate material to the annular inner section of the contact path at the supply position upstream of the transfer opening in an adjacent partition as seen in the particulate material displacement direction in the inner section of the contact path;

introducing a gas flow through the gas inlet in the plenum of the processing chamber and passing the gas through the openings of the gas distribution plate to the contact zone;

displacing the particulate material by the gas flow from the supply position along the contact path to the discharge position in the annular outer section, and discharging the processed particulate material from the annular outer section through an outlet at the discharge position.

* * * * *